United States Patent
Fu et al.

(10) Patent No.: US 12,459,017 B2
(45) Date of Patent: Nov. 4, 2025

(54) SOLAR CELL MODULE RECYCLING APPARATUS AND RECYCLING METHOD THEREFOR

(71) Applicant: NATIONAL UNIVERSITY OF TAINAN, Tainan (TW)

(72) Inventors: Yao-Hsien Fu, Kaohsiung (TW);
Hsueh-Pin Tai, Kaohsiung (TW);
Chia-Tsung Hung, Tainan (TW);
Cheng-Chen Liu, Tainan (TW);
Chun-Chih Hu, Pingtung (TW);
How-Wei Ke, Kaohsiung (TW)

(73) Assignee: NATIONAL UNIVERSITY OF TAINAN, Tainan (TW)

( * ) Notice: Subject to any disclaimer, the term of this patent is extended or adjusted under 35 U.S.C. 154(b) by 167 days.

(21) Appl. No.: 18/274,868

(22) PCT Filed: Oct. 28, 2021

(86) PCT No.: PCT/IB2021/059962
§ 371 (c)(1),
(2) Date: Jul. 28, 2023

(87) PCT Pub. No.: WO2022/167857
PCT Pub. Date: Aug. 11, 2022

(65) Prior Publication Data
US 2024/0123479 A1    Apr. 18, 2024

(30) Foreign Application Priority Data
Feb. 4, 2021    (TW) .................. 110104260

(51) Int. Cl.
*B09B 3/35*    (2022.01)
*H10F 71/00*    (2025.01)
*B09B 101/15*    (2022.01)

(52) U.S. Cl.
CPC ............... *B09B 3/35* (2022.01); *H10F 71/00* (2025.01); *B09B 2101/15* (2022.01)

(58) Field of Classification Search
CPC ......... B09B 3/35; B09B 2101/15; B09B 5/00; H10F 71/00; H10F 19/80;
(Continued)

(56) References Cited

U.S. PATENT DOCUMENTS 5,027,700 A * 7/1991 Tschesche ............... B65G 61/00
414/791.3
2021/0138520 A1 * 5/2021 Wang ..................... B26D 3/281

FOREIGN PATENT DOCUMENTS

JP    2014-54593 A    3/2014
JP    2014054593 A *  3/2014

OTHER PUBLICATIONS

International Search Report, issued in PCT/IB2021/059962, PCT/ISA/210, dated Mar. 2, 2022.
(Continued)

*Primary Examiner* — Michael Y Sun
(74) *Attorney, Agent, or Firm* — Birch, Stewart, Kolasch & Birch, LLP

(57) ABSTRACT

A recycling apparatus for a solar cell module includes a platform for supporting and positioning the solar cell module, and at least one milling device disposed on the platform and having a milling member configured to contact a back plate of the solar cell module, and a casing defining a chip-receiving space and having an air inlet and a suction port communicating with the chip-receiving space. A drive device is connected to the at least one milling device for driving the at least one milling device to move around and mill the solar cell module through the milling member. A recycling method for the solar cell module is also disclosed.

2 Claims, 3 Drawing Sheets

(58) Field of Classification Search
CPC ............. B29B 2017/0484; B29B 17/04; B29L 2031/34; B24B 55/06
See application file for complete search history.

(56) References Cited

OTHER PUBLICATIONS

Written Opinion of the International Searching Authority, issued in PCT PCT/IB2021/059962, PCT/ISA/237, dated Mar. 2, 2022.
Japanese Office Action for Japanese Application No. 2023-545933, dated May 7, 2024, with English translation.

* cited by examiner

SOLAR CELL MODULE RECYCLING APPARATUS AND RECYCLING METHOD THEREFOR

FIELD

The disclosure relates to a recycling apparatus for a solar cell module and a recycling method therefor.

BACKGROUND

An existing solar cell module mainly includes a solar cell, a cover plate and a back plate connected to the two opposite sides of the solar cell through adhesive layers, and an outer frame surrounding the solar cell, the cover plate and the back plate.

During a recycling process of the existing solar cell module, generally, the whole solar cell module is directly crushed, after which the crushed solar cell module is thermally decomposed to allow chemical changes in the adhesive layers, so that the cover plate, the solar cell and the back plate can be separated from each other. However, the cover plate and the solar cell obtained by the thermal decomposition have been contaminated, and because the material used for the back plate is polyvinylidene difluoride (PVDF) or polyvinyl fluoride (PVF), it will produce volatile organic gases (VOCs), hydrofluorocarbons (HFCs) and other substances harmful to the environment during the thermal decomposition process.

Thus, it can be seen that the existing process of separating the solar cell module and the adhesive layers through the thermal decomposition will not only pollute the environment, but also will require high energy consumption which is not economical. Furthermore, the separated cover plate and solar cell have been contaminated, resulting in low economic benefits of the subsequent recycling.

SUMMARY

Therefore, an object of the present disclosure is to provide a recycling apparatus for a solar cell module that can alleviate at least one of the drawbacks of the prior art.

Accordingly, a recycling apparatus fora solar cell module of this disclosure includes a platform, at least one milling device, and a drive device. The solar cell module includes a solar cell, and a back plate and a glass cover plate disposed on two opposite sides of the solar cell. The platform is provided for supporting and positioning the solar cell module. The at least one milling device is disposed on the platform, and includes a milling member configured to contact the back plate of the solar cell module, and a casing that surrounds the milling member, that defines a chip-receiving space and that has an air inlet and a suction port communicating with the chip-receiving space. The drive device is connected to the at least one milling device for driving the at least one milling device to move around and mill the solar cell module through the milling member.

The air inlet is configured to allow outside air to enter the chip-receiving space and contact the milling member. The chip-receiving space is confi-gured to receive chips produced during milling of the solar cell module by the milling member. The air inlet and the suction port cooperate with each other for allowing the chips to be sucked out of the chip-receiving space through the suction port.

Another object of this disclosure is to provide a recycling method for a solar cell module which includes a solar cell, a back plate, a glass cover plate, and an adhesive unit for adhering the back plate and the glass cover plate to two opposite sides of the solar cell. The adhesive unit includes two adhesive layers each of which is disposed between one of the back plate and the glass cover plate and a corresponding one of the two opposite sides of the solar cell.

Accordingly, a recycling method of this disclosure includes: preparing the above recycling apparatus; placing and positioning the solar cell module on the platform such that the back plate is opposite to the platform and the at least one milling device can contact the back plate; actuating the drive device to drive the at least one milling device to move in a three-dimensional space and to mill and remove in sequence the back plate, one of the adhesive layers, the solar cell and the other one of the adhesive layers through the milling member; allowing outside air to enter the chip-receiving space through the air inlet and contact the at least one milling device during milling; and collecting the chips sucked out of the chip-receiving space through the suction port to a collecting device connected to the suction port.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
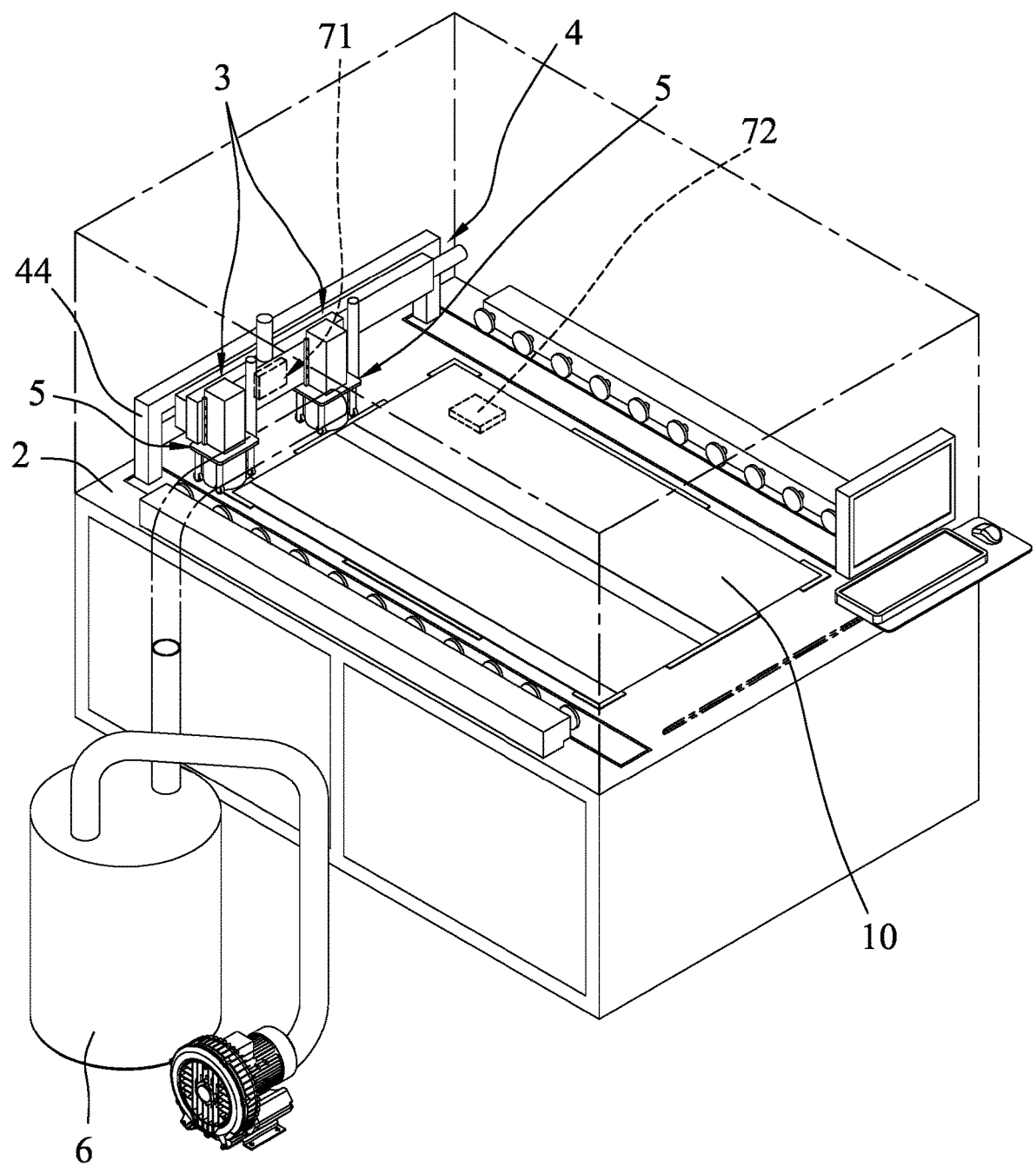
FIG. 1 is a perspective view of a recycling apparatus for a solar cell module according to an embodiment of the present disclosure.
Figure 2:
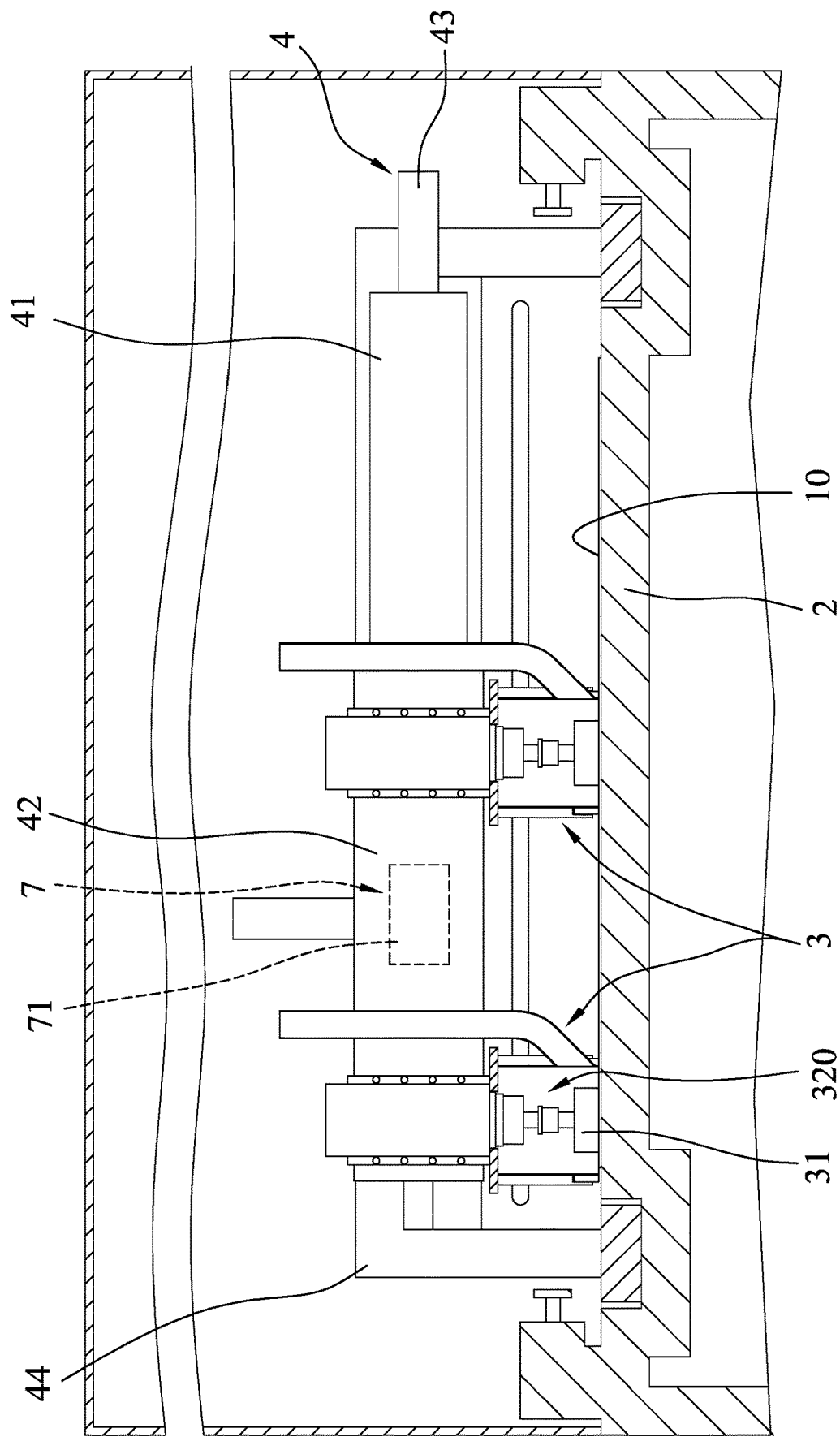
FIG. 2 is a fragmentary schematic sectional view of the embodiment.
Figure 3:
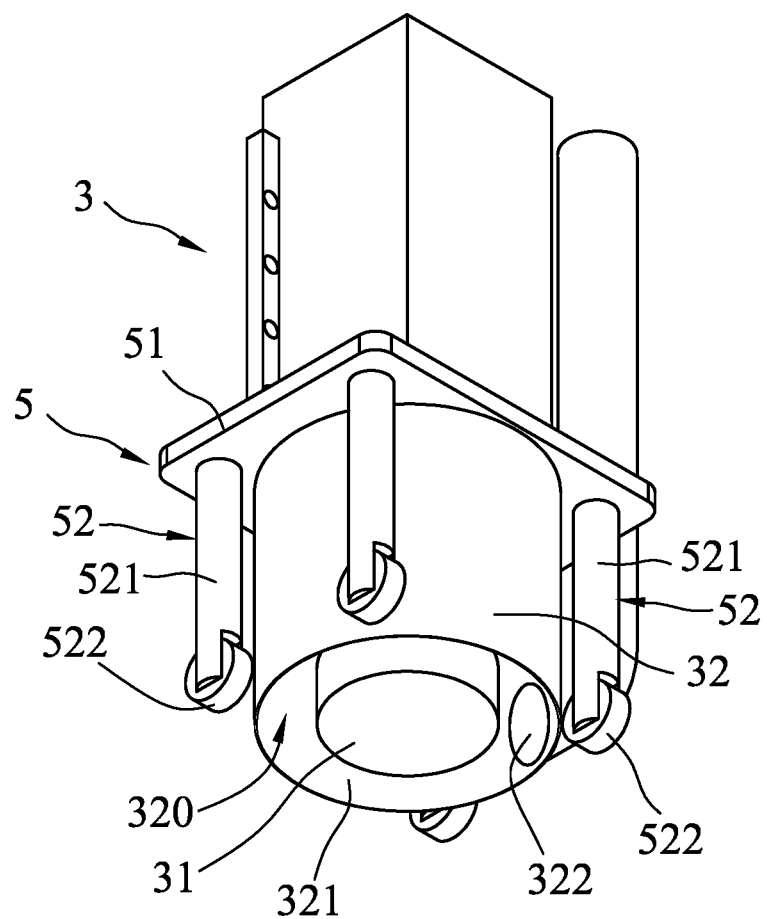
FIG. 3 is a perspective view of a milling device of the embodiment.

Referring to FIGS. 1 to 3, a recycling apparatus for a solar cell module 10 according to an embodiment of the present disclosure includes a platform 2, two milling devices 3, a drive device 4, two smoothing devices 5, a collecting device 6, and a measuring device 7. The solar cell module 10 includes a solar cell, a back plate, a glass cover plate, and an adhesive unit for adhering the back plate and the glass cover plate to two opposite sides of the solar cell. The adhesive unit includes two adhesive layers each of which is disposed between one of the back plate and the glass cover plate and a corresponding one of the two opposite sides of the solar cell.

The platform 2 is mainly used for supporting the solar cell module 10, and has a plurality of suction holes (not shown) for stably positioning the solar cell module 10 thereon.

The milling devices 3 are disposed on the platform 2. Each milling device 3 includes a milling member 31 configured to contact the back plate of the solar cell module 10, and a casing 32 surrounding the milling member 31. The casing 32 has a tubular shape, defines a chip-receiving space 320, and has an air inlet 321 and a suction port 322 communicating with the chip-receiving space 320. It should be noted that the number of the milling device 3 is not limited to what is disclosed herein, and may be one or more than two, and may be adjusted according to actual requirements. In this embodiment, each milling member 31 is exemplified as a CNC spindle, but is not limited thereto. As long the back plate, the solar cell and the adhesive unit of the solar cell module 10 can be milled and removed, any form of the milling member 31 is acceptable.

The drive device 4 includes a horizontal drive mechanism 41, a vertical drive mechanism 42 and a longitudinal drive mechanism 44 connected to the milling devices 3, and a drive motor 43 connected to the horizontal, vertical and longitudinal drive mechanisms 41, 42, 44. The drive device 4 is connected to the milling devices 3 for driving them to move in a three-dimensional space.

The smoothing devices 5 are respectively disposed on the milling devices 3. Each smoothing device 5 includes a press plate 51 located on top of the casing 32 of a respective one of the milling devices 3, and a smoothing unit 52 that extends downward from the press plate 51, that is located on an outer periphery of the casing 32 of the respective milling device 3, and that can contact the solar cell module 10. The press plate 51 can apply force to the smoothing unit 52, so that the smoothing unit 52 can stably press against the solar cell module 10. When the drive device 4 drives the milling devices 3 to move around and mill the solar cell module 10, the solar cell module 10 can be prevented from warping through the assistance of the smoothing devices 5.

It should be noted herein that the driving method for the press plate 51 to apply force to the smoothing unit 52 can be, for example, use of spring or air pressure, but is not limited thereto. Further, in this embodiment, the smoothing unit 52 includes four spaced-apart legs 521 extending downwardly from the press plate 51, and four rollers 522 connected rotatably and respectively to bottom ends of the legs 521. The configuration of the smoothing unit 52 is not limited to what is disclosed herein, and may be, for example, a ring-shaped member surrounding the casing 32, or other forms that can flatten the solar cell module 10.

The collecting device 6 of this embodiment is connected to the suction ports 322 of the casings 32 of the milling devices 3, and is used for collecting the chips sucked out of the chip-receiving spaces 320 of the casings 32 of the milling devices 3 through the suction ports 322 for recycling.

The measuring device 7 includes an optical ruler 71 and a measuring element 72. The optical ruler 71 is disposed on the vertical drive mechanism 42 for measuring the relative positions of the milling members 31 of the milling devices 3. The measuring element 72 is disposed on aside of the platform 2 that is opposite to the solar cell module 10 for measuring the thickness of the glass cover plate of the solar cell module 10. The measuring element 72 may be, for example, an optical element, but is not limited thereto.

To recycle the solar cell module 10 using the recycling apparatus of this disclosure, the drive device 4 is first actuated to drive the milling devices 3 to move in a three-dimensional space so as to mill and remove the back plate, the adhesive unit and the solar cell of the solar cell module 10 through the milling members 31, and outside air is allowed to enter the chip-receiving space 320 of each casing 32 through the air inlet 321 thereof and contact each milling member 31 for reducing the temperature thereof. Through cooperation of the air inlet 321 and the suction port 322, the chips received in the chip-receiving space 320 of each casing 32 can be sucked out therefrom into the collecting device 6 through the suction port 322.

In order to explain more clearly how the solar cell module 10 is recycled using the recycling apparatus of this disclosure, the steps involved in a method for recycling the solar cell module 10 will be described in detail below.

The recycling apparatus of this disclosure is first prepared.

The solar cell module 10 is then disposed on the platform 2 such that the back plate is opposite to the platform 2 and can be contacted by the milling members 31 of the milling devices 3.

Next, the drive motor 43 of the drive device 4 is actuated to drive the horizontal, vertical and longitudinal drive mechanisms 41, 42, 44, which in turn, drive the milling members 31 to move in a three-dimensional space so as to sequentially mill and remove the back plate, one of the adhesive layers, the solar cell, and the other adhesive layer of the solar cell module 10 from the glass cover plate thereof, so that the glass cover plate can also be recycled. It should be noted herein that each milling member 31 of this embodiment is configured as a CNC spindle, and in coordination with the drive device 4, the accuracy of movement of the milling members 31 in the three-dimensional space can reach a micron (µm) level.

Further, because of the multilayer structure of the solar cell module 10 with the back plate disposed above the adhesive unit, when the milling members 31 mill and remove the back plate, they will also contact the adhesive layer below the back plate. Since the back plate is mainly made of a material, such as polyvinylidene difluoride (PVDF), and the adhesive layer is made of a material, such as ethylene vinyl acetate (EVA), there is a difference in the degree of hardness between the two. Moreover, each milling member 31 of this embodiment has a sensor (not shown) for detecting a resistance data. That is, the resistance produced by each milling member 31 when milling the back plate and the adhesive layer will be different due to the difference in the hardness of the two. Therefore, when the resistance data detected by the sensor of each milling member 31 changes, it can be distinguished whether the back plate or the adhesive layer is being removed during milling. In this way, each milling member 31 will not mill and remove the adhesive layer when removing the back plate.

After the back plate is milled and removed, the milling members 31 will mill and remove the two adhesive layers together with the solar cell without damaging the glass cover plate, so that the glass cover plate can also be recycled. This is done by first measuring the thickness of the glass cover plate using the measuring element 72 and determining the relative positions of the milling members 31 through the optical ruler 71.

Moreover, during removal of the back plate and the adhesive unit together with the solar cell, the each smoothing device 5 can apply force against the solar cell module 10 to abut against the platform 2, and in coordination with the suction holes in the platform 2 and an external suction device (not shown) connected to the suction holes, the solar cell module 10 can be adsorbed on the platform 2 and stably positioned thereon.

When milling and removing the adhesive unit together with the solar cell, since each milling member 31 will generate heat which can cause the adhesive layers to become sticky and hinder the removal process, each milling device 3 can allow outside air to enter the chip-receiving space 320 through the air inlet 321 thereof and cool down each milling member 31, thereby preventing the adhesive layers from sticking to the solar cell. Further, through the cooperation of the air inlet 321 and the suction port 322 of each casing 32, the chips received in the chip-receiving space 320 of each casing 32 can be sucked out therefrom into the collecting device 6 through the suction port 322 of each casing 32 for recycling. Moreover, during the removal of the adhesive layers together with the solar cell, the chips of the solar cell and the chips of the adhesive layers generated during milling have different particle sizes measured in micron (µm) range and in millimeter (mm) range, respectively. The chips of the solar cell and the chips of the adhesive layers also have different conductivity and density. Thus, two different sizes of chips can be collected by the collecting device 6, and can be separated by a simple sieving method, thereby reducing the recycling costs.

In summary, in the recycling apparatus and the recycling method of this disclosure, each milling member 31 is configured as a CNC spindle, and in coordination with the drive device 4, each milling member 31 can move in the three-dimensional space with an accuracy that can reach a micron (µm) level. Further, each milling member 31 has a sensor for detecting a resistance data. When there is a changed in the resistance data detected by the sensor of each milling member 31, it can be distinguished whether the back plate or the adhesive layer is removed by the milling members 31 during milling. Then, with the measuring element 72 measuring the thickness of the glass cover plate, and in coordination with the optical ruler 71 that determines the relative positions of the milling members 31, the milling members 31 can mill and remove the adhesive unit together with the solar cell without damaging the glass cover plate, so that the glass cover plate can also be recycled. During the milling and removal process, the outside air can enter the chip-receiving space 320 of each casing 32 through the air inlet 321 thereof to cool down the milling member surrounded by each casing 32 so as to prevent the adhesive layers from sticking to the solar cell. Further, through the cooperation of the air inlet 321 and the suction port 322, the chips received in the chip-receiving space 320 of each casing 32 can be sucked out therefrom into the collecting device 6 through the suction port 322 thereof for recycling. In the overall recycling process of this disclosure, it is not necessary to recycle the solar cell module in a high temperature energy-consuming manner as in the existing ones, and it can also avoid polluting the recycled materials, thereby making the overall recycling process easier, so that the cost of recycling can be effectively reduced. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A recycling apparatus for a solar cell module, the solar cell module including a solar cell, and a back plate and a glass cover plate disposed on two opposite sides of the solar cell, said recycling apparatus comprising:
    a platform for supporting and positioning the solar cell module;
    at least one milling device disposed on said platform and including a milling member configured to contact the back plate of the solar cell module, and a casing that surrounds said milling member, that defines a chip-receiving space and that has an air inlet and a suction port communicating with said chip-receiving space; and
    a drive device connected to said at least one milling device for driving said at least one milling device to move around and mill the solar cell module through said milling member;
    said air inlet being configured to allow outside air to enter said chip-receiving space and contact said milling member;
    said chip-receiving space being configured to receive chips produced during milling of the solar cell module by said milling member; and
    said air inlet and said suction port cooperating with each other for allowing the chips to be sucked out of said chip-receiving space through said suction port;
    wherein said recycling apparatus further comprises a smoothing device movable along with said at least one milling device and including a press plate that is located on said casing, and a smoothing unit that extends downward from said press plate, that is located on an outer periphery of said casing and that is configured to contact the back plate of the solar cell module;
    wherein said at least one milling device includes a plurality of milling devices, said drive device including a horizontal drive mechanism, a vertical drive mechanism and a longitudinal drive mechanism connected to said milling devices, and a drive motor connected to said horizontal drive mechanism, said vertical drive mechanism and said longitudinal drive mechanism; and
    wherein said recycling apparatus further comprises a measuring device that includes an optical ruler and a measuring element, said optical ruler being disposed on said vertical drive mechanism for measuring relative positions of said milling members, said measuring element being disposed on a side of said platform that is opposite to the solar cell module for measuring the thickness of the glass cover plate of the solar cell module.

2. The recycling apparatus as claimed in claim 1, further comprising a collecting device connected to said suction port for collecting the chips sucked out of said chip-receiving space through said suction port.

* * * * *